United States Patent [19]

Good

[11] 4,268,189
[45] May 19, 1981

[54] APPARATUS AND METHOD FOR SUPPORTING AND POSITIONING PIPE DURING THE CONSTRUCTION OF DRAIN FIELDS AND THE LIKE

[76] Inventor: William C. Good, Rte. 1, Great Falls, S.C. 29005

[21] Appl. No.: 79,117

[22] Filed: Sep. 26, 1979

[51] Int. Cl.³ ............................................. B63B 35/04
[52] U.S. Cl. .................................... 405/154; 138/105; 405/172; 248/49
[58] Field of Search ........................ 405/154, 156, 172; 248/49, 55; 138/105; 254/93 R

[56] References Cited

U.S. PATENT DOCUMENTS

| | | | |
|---|---|---|---|
| 3,568,455 | 3/1971 | McLaughlin et al. | 138/105 X |
| 3,810,364 | 5/1974 | Johnson | 405/154 |
| 4,090,686 | 5/1978 | Yarbrough | 405/154 X |
| 4,146,345 | 3/1979 | Silvestri | 405/188 X |
| 4,218,044 | 8/1980 | Ikhsanov et al. | 405/154 X |

*Primary Examiner*—Dennis L. Taylor
*Attorney, Agent, or Firm*—Bell, Seltzer, Park & Gibson

[57] ABSTRACT

The apparatus and method of this invention includes the use of a pipe supporting apparatus or apparatuses having a generally horizontal elongate support member with spaced apart clamping units thereon arranged for clampingly suspending flexible pipe sections from the elongate support member, and the elongate support member is adjustably supported for vertical adjustment on substantially vertically disposed elongate anchoring members adapted to be driven into a grade surface so as to firmly anchor the respective pipe supporting apparatus against displacement to maintain the same and the pipe section or sections supported thereby against horizontal or vertical displacement during the pouring and spreading of aggregate around the pipe section or sections. This arrangement facilitates the subsequent releasing of the pipe section or sections from the pipe supporting apparatus and the removal of the pipe supporting apparatus from the aggregate while leaving the corresponding pipe section or sections embedded therein.

19 Claims, 9 Drawing Figures

U.S. Patent May 19, 1981 Sheet 1 of 4 4,268,189
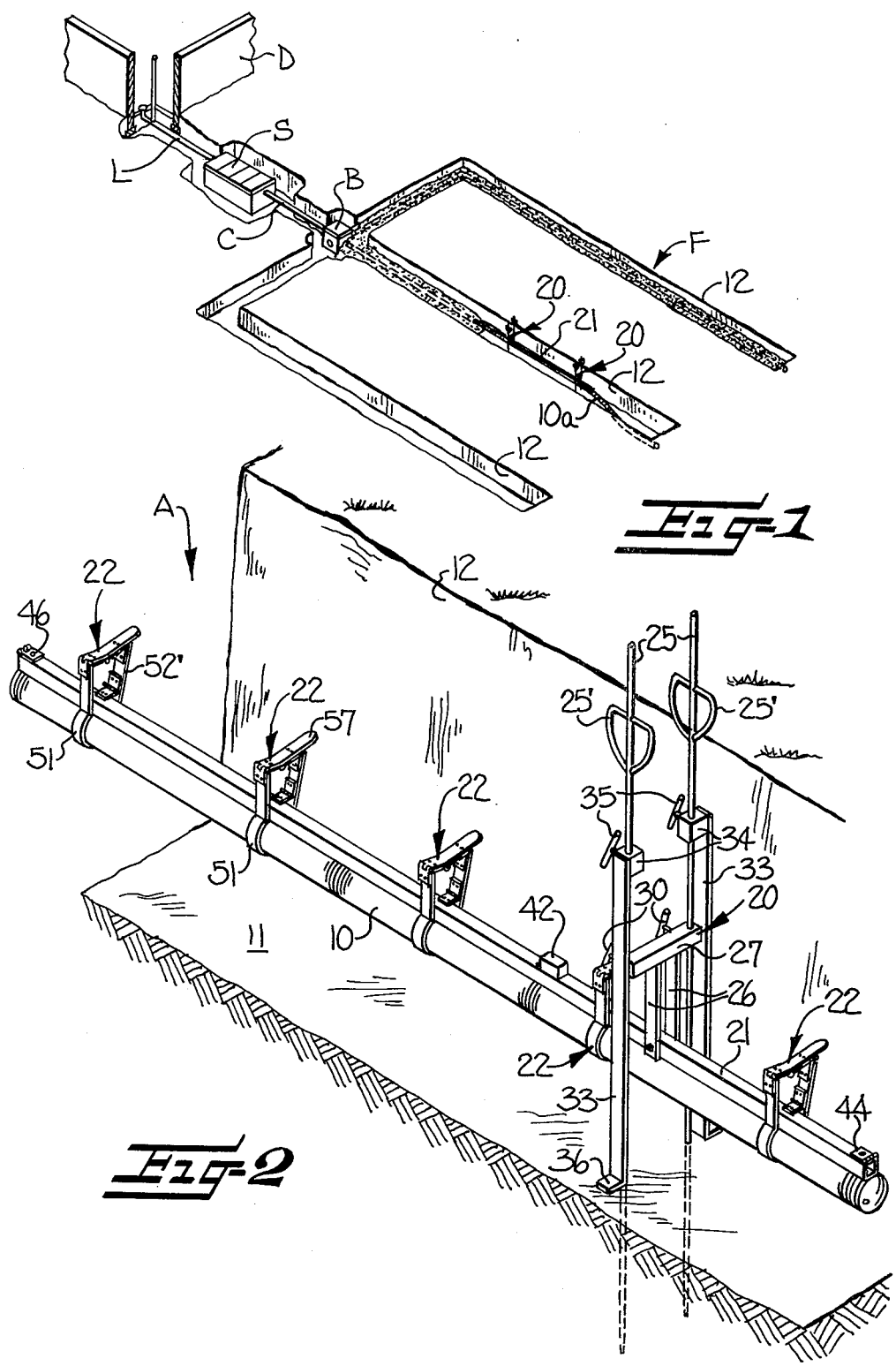

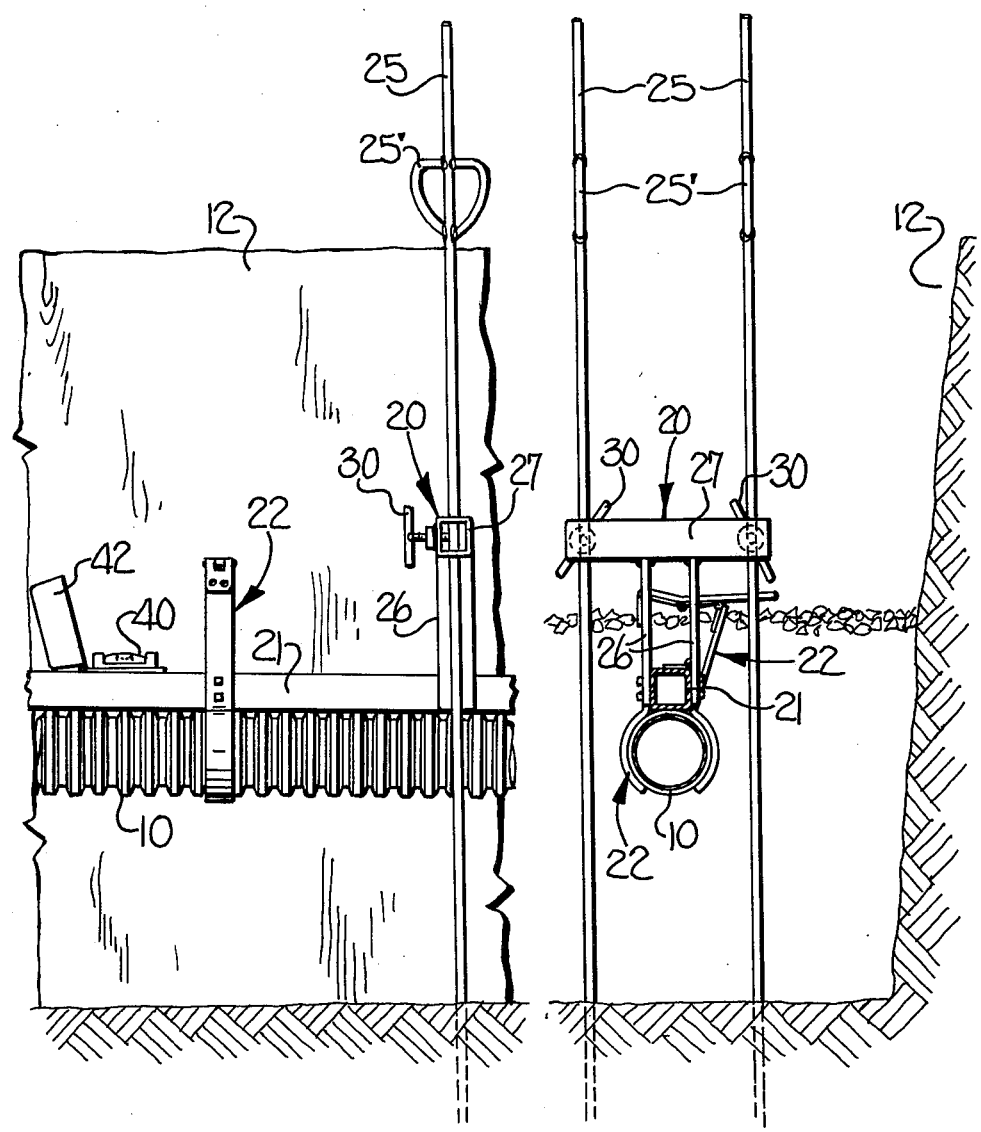

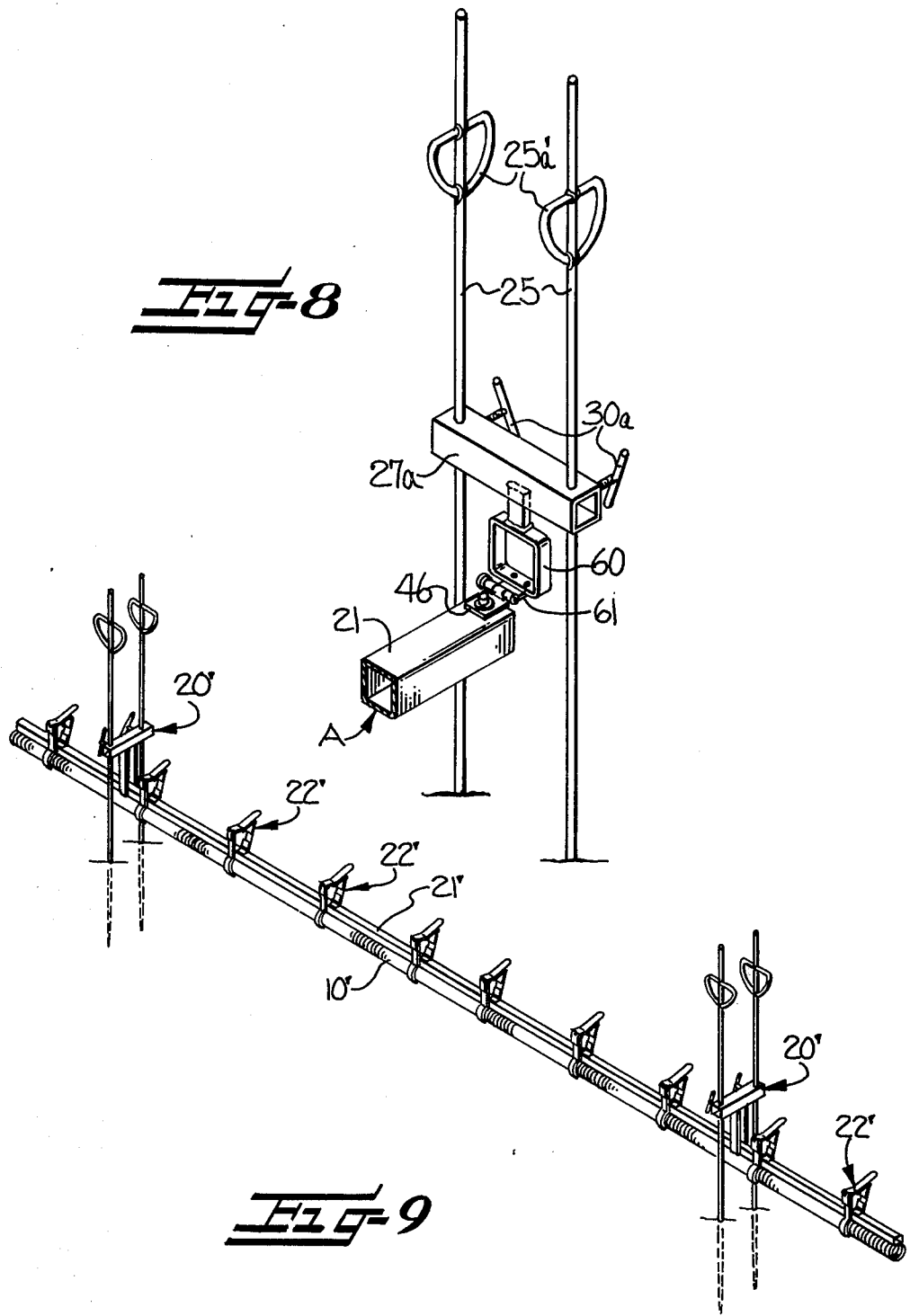

APPARATUS AND METHOD FOR SUPPORTING AND POSITIONING PIPE DURING THE CONSTRUCTION OF DRAIN FIELDS AND THE LIKE

BACKGROUND OF THE INVENTION

The present invention relates to an apparatus and method for supporting and positioning pipe sections during the construction of drain fields and the like in which connected pipe sections are laid with surrounding aggregate on a grade surface below ground level.

The laying of flexible pipe in the construction of septic tank drain fields and other similar construction has been widely adopted in lieu of the previously used drain title sections. Heretofore, such construction has met with difficulty in the proper positioning of the flexible pipe during the construction process, since such pipe must be maintained in such proper position while being surrounded by aggregate.

Conventionally, drain field construction has been accomplished by utilization of grade stakes driven into the earth along the center of the ditch or trench in which the pipe was to be placed. A grade board was then fastened to the grade stakes with the top edge of the board spaced from the bottom of the ditch a distance equal to the amount of aggregate desired beneath the drain pipe. Aggregate then would be poured into the ditch to the level of the board top edge. The successive drain pipe sections then would be manually placed on top of the grade board, properly interconnected, and manually held in place while additional aggregate was poured around and over the drain pipe to the required level. While still widely practiced, this method of construction is time consuming and inexact, and requires a number of workmen during the construction.

Attempts have been made to solve the problems posed by such conventional drain field construction, but while providing some improvement, such attempts have not solved these problems and have presented additional problems. One such attempt is disclosed in U.S. Pat. No. 3,895,496. The apparatus of that patent does provide support for a pipe section during pouring of aggregate, and thereby obviates the use of grade stakes and grade boards, but since it employs spring clips attached beneath an elongate support member and into which spring clips a pipe section could be pushed during construction, additional problems are presented. Such spring clips rely solely upon resilient force to hold each pipe section during pouring of the aggregate thereabout which makes the pipe section subject to becoming dislodged from the apparatus during pouring of the aggregate. Even if the pipe section does not become dislodged, once the pipe section is embedded in the aggregate, the pipe section then must be removed from the spring clips and this removal frequently may displace the pipe section within the aggregate.

Additionally, the prior art apparatus of the aforementioned patent does not firmly anchor a pipe section during pouring of the aggregate, since one end of the elongate support member of such apparatus passively rests on an exposed end portion of a previously positioned pipe section while the other end of the elongate member is passively supported by an upright member, perpendicular to the elongate member, which rests on the bottom of the drainage ditch. Unless such prior art apparatus is manually held in position during the pouring of the aggregate, the entire apparatus and pipe section might be easily displaced by the aggregate, which would require interruption of the pipe laying process or could result in an improperly constructed drain field.

SUMMARY OF THE INVENTION

It is an object of the present invention to provide an apparatus and method which solves the afore-mentioned problems and deficiencies encountered in conventional construction of drain fields by obviating the need for grade stakes and boards while firmly supporting and positioning the pipe sections during pouring of the aggregate. Another object of this invention is to provide positively operable and actuatable clamping means to positively engage and disengage pipe sections during the construction process to allow pipe sections to be firmly supported in position during construction and to allow easy removal of the apparatus from the positioned drain pipe and surrounding aggregate without dislodgement or displacement of the pipe sections.

A further object of the invention is to provide an apparatus and method by which the pipe sections are firmly anchored in proper position during the pouring of the aggregate to obviate the need for manual supporting or positioning of the pipe sections during construction of a drain field.

A still further object of the invention is to provide an apparatus and method which facilitates a continuity of installation of interconnected pipe sections, in that two or more such apparatuses may be interconnected during the construction process in such a manner as to conform to curvature of the drainage ditch and may be used in a leapfrog fashion to lay pipe the entire length of the drainage ditch.

The foregoing objects are achieved by providing an apparatus embodying an elongate support member or support member section along which clamping means, able to be positively engaged and disengaged from pipe sections, are carried at spaced-apart locations, in order that a pipe section may be suspendingly supported in a desired position during installation thereof. A pair of vertically disposed, elongate anchoring members or posts, adapted to be driven into the ground, carry the elongate support member so as to secure the apparatus to the ground and to properly position a clamped pipe section or portion relative to the grade surface.

The present invention further provides a method of laying a drain field in which a first pipe supporting apparatus is positioned and anchored in the bottom of the ditch or trench for the drainage line with a first pipe section clampingly and suspendingly supported thereby. A second pipe supporting apparatus is positioned adjacent one end of the first apparatus and pivotally connected thereto to allow relative pivotal movement of the proximal ends of the first and second apparatuses. An additional pipe section is then connected to the adjacent end of the first pipe section and clampingly supported by the second pipe supporting apparatus. Aggregate then may be poured and spread to the proper level above the grade surface along at least the length of the first pipe section, which then may be disengaged from clamping means of the first pipe supporting apparatus. The first pipe supporting apparatus then may be disconnected from the second apparatus and removed from the aggregate and moved to the end of the second pipe supporting apparatus remote from the first pipe section to allow interconnection of additional pipe sections in a similar leapfrog manner for the entire length of the drain field.

BRIEF DESCRIPTION OF THE DRAWINGS

Some of the objects and advantages of the invention having been stated, others will appear as the description proceeds when taken in connection with the accompanying drawings, in which—

FIG. 1 is a perspective view of a typical septic tank drainage system with an exposed or yet uncovered portion of the flexible pipe being installed in a septic tank drain field in accordance with the present invention;

FIG. 2 is an enlarged perspective view of a preferred embodiment of pipe supporting apparatus for installing a flexible pipe section in accordance with the method of the present invention;

FIG. 3 is an enlarged fragmentary side elevational view of a right-hand portion of the pipe supporting apparatus shown in FIG. 2;

FIG. 4 is a fragmentary end elevational view, partially in section, looking at the right-hand side of FIG. 3;

FIG. 8 is a perspective view of a start-up pipe anchoring support unit used for supporting an otherwise unsupported trailing end of one of the elongate support member sections and a respective start-up pipe section; and FIG. 9 is a perspective view similar to FIG. 2, but showing a modified embodiment of the invention wherein two of the improved pipe anchoring support units support a common elongate pipe supporting member.

DETAILED DESCRIPTION

Figures 5, 6:
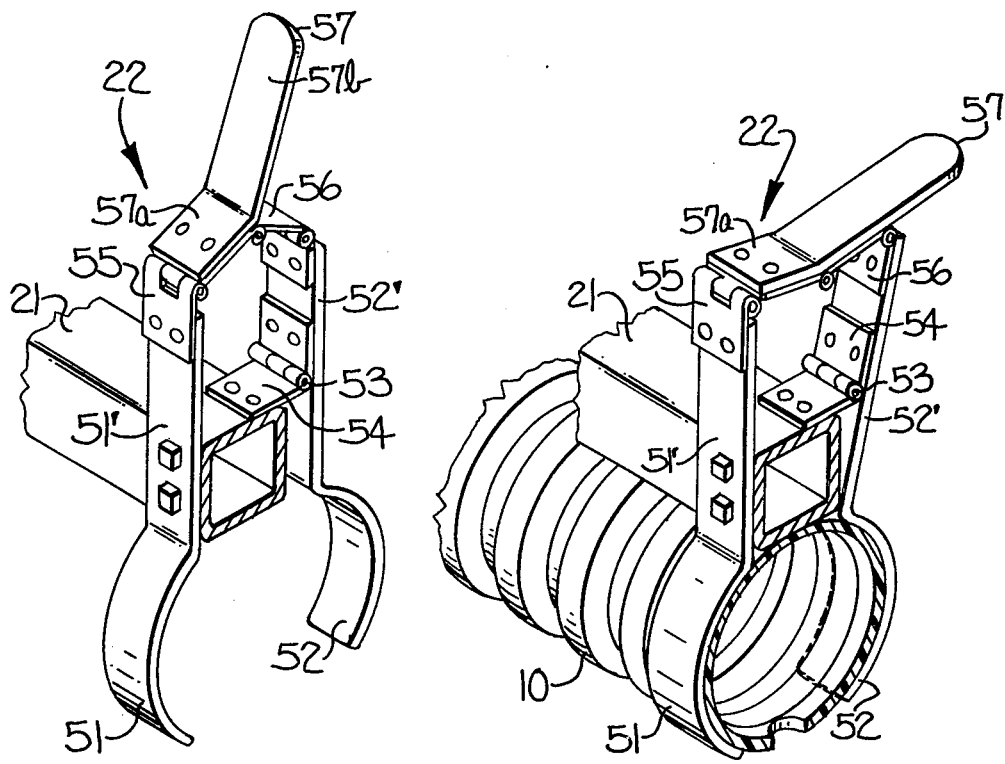
FIG. 5 is an enlarged perspective view of pipe suspending clamping means carried by an elongate pipe supporting member of the apparatus, with the clamping elements or jaws of the clamping means in open position.
FIG. 6 is a fragmentary view similar to FIG. 5, but showing the clamping elements in closed position in engagement with a pipe section therebetween.

While the present invention will be described hereinafter with particular reference to the accompanying drawings, in which an illustrative embodiment of the present invention is set forth, it is to be understood at the outset of the description which follows that it is contemplated that persons skilled in the applicable arts may modify the specific details to be described while continuing to use this invention. Accordingly, the description is to be understood as a broad teaching of this invention, directed to persons skilled in the applicable arts.

Referring now to FIG. 1 of the drawings, a typical septic tank drainage system is there shown including a partially constructed drain field F of interconnected flexible pipe sections extending from the usual distribution box B. The distribution box B is connected by suitable conduit means C to the discharge outlet of a septic tank S to which a sewer line L extends from a building D.

As is well known in the art, the drain fields of contemporary septic tank drainage systems are made up of one or more lines or series of interconnected flexible pipe sections, usually in the form of corrugated plastic conduits or tubes, which must be laid to grade so as to assure a desirable drainage flow. In order to avoid problems heretofore attendant to known methods of installing the flexible pipe sections of drain fields, as discussed earlier herein, the present invention provides an improved method of laying a drain field in which each successive flexible pipe section is firmly clampingly supported by an improved pipe supporting apparatus in a desired or properly spaced relation above the grade surface defined by the bottom of the ditch in which the pipe sections are being installed, and wherein each successive pipe section and its supporting apparatus are restrained against horizontal or vertical displacement while aggregate is being poured in the ditch to the desired proper level above the grade surface and in surrounding relation to the respective pipe section, after which the respective pipe section is released from its clamping supporting apparatus and such apparatus is removed from the aggregate in the ditch while leaving the pipe section embedded therein preparatory to repeating the foregoing procedure.

Accordingly, referring particularly to FIGS. 2, 3 and 4 of the drawings, it will be observed that a typical flexible pipe section 10 is there shown suspendingly supported in a predetermined spaced relation above the bottom or grade surface 11 of a ditch or trench 12 by means of an improved pipe supporting and positioning apparatus generally comprising an improved pipe positioning and anchoring means or pipe anchoring support unit broadly designated at 20, an elongate, rigid, substantially horizontal supporting member or frame member 21 carried by the support unit 20, and a plurality of longitudinally spaced pipe suspending clamping means or units each of which is broadly designated at 22. As shown in FIGS. 2, 3 and 4, the pipe anchoring support unit 20 serves to support the pipe supporting member 21 for vertical adjustment thereon adjacent one end of the member 21, which end may be defined as the front or forward end of the pipe supporting member 21. The clamping units 22 are carried by the elongate pipe supporting member 21 for releasably clampingly receiving in the lower portions thereof a pipe section or portion 10 being installed in the ditch or trench 12 previously formed in the ground. The preferred manner of supporting the other or rear end portion of the pipe supporting frame member 21, remote from the support unit 20, will be later described.

The pipe anchoring support unit 20 of FIGS. 2, 3 and 4 comprises a pair of elongate anchoring members or posts 25, which may take the form of metal rods, and which normally occupy a substantially vertically disposed or upright position astraddle the elongate pipe supporting member 21. The lower ends of the anchoring members 25 may be pointed so as to be readily driven into the grade surface 11 for firmly anchoring the pipe supporting member 21 and the corresponding pipe section 10 with respect to the grade surface 11.

Mounting means is carried by the elongate supporting member 21 and is adjustably connected to the anchoring members 25 for vertical adjustment to position the supporting member 21 at the desired proper height above the grade surface 11. Accordingly, it will be observed in FIGS. 2, 3 and 4 that such mounting means comprises a pair of upstanding frame members 26 whose lower portions are suitably secured to opposite sides of the elongate supporting member 21 and whose upper portions are suitably secured to a crossbar or transverse frame member 27 which, along with the upstanding frame members 26, may be considered as part of the pipe anchoring support unit 20. It is seen in FIG. 4 that the crossbar 27 and the upstanding frame members 26 collectively present a substantially T-shaped configuration. The crossbar 27 is loosely or slideably penetrated by the respective vertically disposed elongate anchoring members 25, and the crossbar 27 is held in the desired vertically adjusted position longitudinally of the respective elongate anchoring members 25 by suitable adjustable elements, shown in the form of set screws 30, which may be threaded into the crossbar 27 for engaging the respective anchoring members 25. The adjustment screws 30 may each be of substantially "T" shape in order to provide handle means thereon to aid an operator in tightening and loosening the screws 30 with respect to the elongate anchoring members 25.

It is thus apparent that the crossbar 27 may be vertically adjusted relative to the elongate anchoring members 25 after they have been driven into the grade surface 11 so as to position the corresponding portion of the pipe supporting member 21 at the desired proper level above the grade surface 11 and to thereby position the pipe section 10 at the desired level above the grade surface 11 of the ditch 12. The upper portions of the elongate anchoring members 25 may each be provided with suitable handle members 25' thereon to aid an operator in withdrawing the anchoring members 25 from the grade surface following the installation of the corresponding pipe section 10 in the ditch 12. The handle members 25' project outwardly from the upper portions of the anchoring members 25 so the handle members also may be struck by a suitable hand-held tool, if desired, for aiding in driving the anchoring members 25 into the grade surface 11.

A pair of vertically disposed elongate footed members or columns 33 optionally may be employed in association with the vertically disposed anchoring rods 25 as shown in FIG. 2 only. Footed members 33 have inwardly projecting upper portions 34 thereon which are spaced above crossbar 27 and through which the pipe anchoring members 25 loosely or slideably extend. The upper portions 34 of footed members 33 are provided with set screws 35, similar to the screws 30, for locking the anchoring members 25 in the desired positions. Footed members 33 are provided with laterally extending foot portions 36 on their lower ends which may rest on the grade surface 11 if the surface is soft or non-firm so as to firmly support the posts 25 thereon. Footed members 33 need not be used if the grade surface is sufficiently firm, as shown in FIGS. 3 and 4, for example.

In the illustrated embodiment, the elongate, rigid pipe supporting member 21 is shown in the form of an elongate tube of substantially rectangular or square cross-section, but it may be of another shape in cross-section, if desired. The elongate, rigid pipe supporting member 21 may be of substantially the same length as a typical or regular-length pipe section, which is usually about 10 feet long. However, a similar elongate, rigid pipe supporting member 21', substantially equal in length to two or more interconnected typical pipe sections or to a relatively long single pipe section, may be utilized if desired, as shown in FIG. 9, and as will be later described.

A suitable indicating means, such as a spirit level 40, may be fixedly mounted on a medial portion of the elongate, rigid pipe supporting member or frame member 21 (FIGS. 3 and 4) and in the vicinity of the anchoring support unit 20 so as to be visible by an operator to aid the operator in positioning the pipe supporting member 21 at the desired proper position relative to grade. The spirit level 40 may be of a well-known type having suitable graduations for readily visually determining the angular attitude of the pipe supporting member 21 relative to grade. A suitable cover 42 (FIG. 3) may be hingedly connected to the pipe supporting member 21 and adjacent the spirit level 40 so as to be positioned over and shield the same when the level is not being used.

In accordance with the method of this invention, and as will be further described later in this context, at least two pipe supporting apparatuses are employed, namely, a first pipe supporting apparatus A and a second pipe supporting apparatus A-1, both of which may be substantially the same as the first pipe supporting apparatus A as particularly described with reference to FIGS. 2, 3 and 4. Accordingly, only a trailing or rear end portion of the elongate pipe supporting member 21 of the second pipe supporting apparatus A-1 is shown in FIG. 7.

In practicing the method, the first pipe supporting apparatus A is positioned substantially as illustrated in FIG. 2, with a first pipe section 10 suspended therefrom, and thereafter, the second pipe supporting apparatus A-1 is positioned adjacent one end of the first apparatus (which end may be termed as the "front" or "leading" end) in the same manner as the first apparatus was positioned, and the adjacent or proximal end portions of the first and second pipe supporting apparatuses are interconnected in such a manner as to allow substantially horizontal relative pivotal movement therebetween, if desired.

Such horizontal relative pivotal movement between the interconnected first and second pipe supporting apparatuses may be required in some instances, particularly where there are bends in, or projecting rocks or other obstructions on, the walls of the ditch 12. In fact, there may be instances in which it is desirable or necessary to form a bend in medial portion of one of the regular pipe sections 10, as in FIG. 7, or in a medial portion of a length of flexible pipe which may be substantially longer than one or more of the elongate pipe supporting members 21 or 21' (see FIG. 9) as, for example, the relatively long length of flexible pipe 10a shown in the central portion of the drain field F of FIG. 1. Accordingly, the elongate pipe supporting member 21 may be made up of one or more relatively shorter sections joined together as will be presently described with respect to FIG. 7, the proximal ends of two adjacent regular-length pipe supporting members 21 may be joined together as in FIG. 7, and/or two relatively longer pipe supporting members, such as the pipe supporting member 21' of FIG. 9, may be joined together as in FIG. 7, wherein it will be observed that the portion of the pipe section 10 there shown has a bend in a medial portion thereof.

Figure 7:
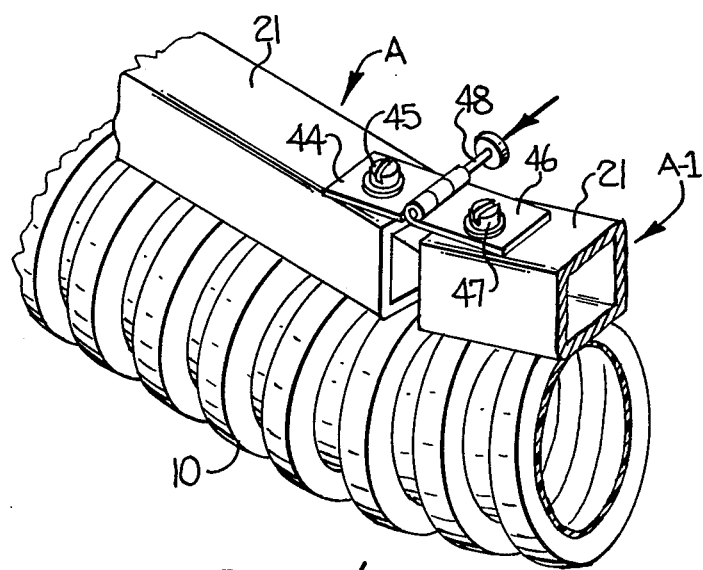
FIG. 7 is a perspective view illustrating a preferred means for interconnecting the proximal ends of two adjacent elongate pipe supporting members or two separable sections of a pipe supporting member in generally coextensive relationship.

Since it has already been indicated above that the pipe supporting members 21 shown in FIG. 7 represent the proximal ends of the first and second pipe supporting apparatuses A, A-1, the means for joining together the proximal ends of the two pipe supporting members 21 there shown will now be described. At the outset, it is to be noted that opposite ends of each pipe supporting member 21 are provided with connection means or connecting members which are shown on the proximal ends of the two pipe supporting members 21 shown in FIG. 7, wherein it can be seen that such proximal ends are detachably pivotally interconnected in substantially coextensive relation to each other by means of a first connecting member or hinge member 44 which may be in the form of one-half of a butt hinge, and is pivotally mounted for movement about a substantially vertical axis, as at 45, on the upper surface of that end portion of the left-hand or rear pipe supporting member 21 shown in FIG. 7. Hinge member 44 is adapted to cooperate with a similar, but mating, second connecting member or hinge member 46 pivotally connected, as at 47 (FIG. 7) to the upper surface of the adjacent end of the elongate pipe supporting member 21 of the second pipe supporting apparatus A-1.

Thus, it can be seen in FIG. 2 that a first connecting member 44 is mounted on the right-hand or leading end portion of the pipe supporting member 21 there shown, and a second connecting member 46 is mounted on the left-hand or rear end portion of the same elongate pipe supporting member 21 in FIG. 2. A connecting pin or hinge pin 48 is removably insertable in the cooperating or mating proximal portions of the connecting members 44, 46 at the proximal ends of the two adjacent pipe supporting members 21 in FIG. 7 for releasably pivotally interconnecting the successive first and second pipe supporting apparatuses A and A-1.

Since the first and second connecting members 44, 46 may be in the form of respective halves or leaf portions of a butt hinge, it is apparent that the cooperating portions of the first and second connecting members comprise spaced apart projecting portions (see FIG. 7) having aligned holes therethrough through which the connecting pin 48 is adapted to be inserted to facilitate quickly and easily connecting two of the pipe supporting apparatuses together to permit the laying of pipe in any one of straight line, curved, or angular configurations or combinations thereof.

As heretofore described, pipe suspending clamping means or units 22 are spaced along the length of the pipe supporting member 21 for clampingly supporting at least one pipe section 10 parallel to and in suspended relation to the supporting member 21. As best shown in FIGS. 5 and 6, each clamping unit 22 comprises a pair of opposing first and second clamping elements or jaws 51, 52 which may be made from sheet metal, such as spring steel, and which have contoured or arcuate lower portions adapted to fit the circumferential contour or outer surface of the pipe section 10. As shown, the clamping elements are so shaped as to cooperate with the lower surface of the elongate pipe supporting member 21 on which they are mounted so as to retain the corresponding portion of the pipe section 10 against the lower surface of the elongate pipe supporting member 21 when the clamping elements occupy the closed or clamping position shown in FIG. 6. In this regard, it should be noted that the free lower end portions of the clamping elements 51, 52 are spaced apart from each other, when in an open position, a sufficient distance to permit easy insertion of a corresponding portion of a flexible pipe section 10 therebetween as it is being positioned below and against the lower surface of the elongate pipe supporting member 21. Thereupon, the respective clamping elements 51, 52 are actuated to the closed position of FIG. 6.

The clamping elements 51, 52 have respective upstanding portions or arms 51' and 52' thereon, the arm 51' being suitably secured to one side of the elongate pipe supporting member 21. The other upstanding arm 52', extending from clamping element 52, is pivotally connected to the elongate pipe supporting member 21 in offset relation thereto, so that the pivot for the arm 52' and the clamping element 52 may be spaced outwardly from and adjacent the upper surface of the elongate pipe supporting member 21. In this instance, the latter pivot, indicated at 53, is formed at the juncture of two leaf portions of a butt hinge 54, one of such portions being suitably secured to the elongate pipe supporting member 21 and the other portion of the hinge 54 being secured to the upper portion or arm 52' of the clamping element or jaw 52.

Actuating means is provided for effecting relative movement between the clamping jaws or jaw members 51, 52 to positively clamp or release a pipe section therebetween. As preferred, the actuating means associated with each clamping unit 22, is shown (FIGS. 5 and 6) in the form of a manually operable toggle linkage or mechanism and compriss first and second actuating members 55, 56 hinged together at their proximal ends between the upper portions or arms 51', 52' of the clamping jaws 51, 52 and also hingedly connected to the respective upper portions 51', 52' of the clamping jaws 51, 52. A locking and operating member or hand lever means 57 includes a mounting portion 57a fixed to the upper surface of the actuating member 55 and a locking portion 57b integral with the mounting portion and extending outwardly and upwardly therefrom at an obtuse angle. The jucture of the mounting and locking portions 57a, 57b is closely adjacent the hinged together proximal ends of the actuating members 55, 56 so that the locking and operating member or hand lever means 57 permits manual upward and downward pivotal movement of the actuating members to clamp and unclamp pipe sections between the jaws 51, 52 and to lock the jaws 51, 52 in the clamped position of FIG. 6 when the actuating members 55, 56 are moved downwardly past horizontal and the locking portion 57b engages the actuating member 56.

To aid in the installation of an initial or start-up pipe section of a series of such pipe sections, such as the rearmost or initial pipe section in each branch or run of the drain field F in FIG. 1, since the rear or trailing end of the start-up or initial pipe section may not be supported otherwise, the invention includes a start-up positioning means or anchoring support unit 20a (FIG. 8) which is generally similar to the anchoring support unit 20 of FIGS. 2, 3 and 4, but differs therefrom in that it is constructed for detachably connecting the rear or trailing end portion of the elongate pipe supporting member 21 thereto. Accordingly, it will be observed in FIG. 8 that the start-up pipe anchoring support unit 20a includes a pair of substantially vertically disposed elongate anchoring members or posts 25a, 25a which may be identical to those indicated at 25, 25 in FIG. 2.

However, instead of the generally T-shaped crossbar 27 and frame members 26 of FIG. 2 being used, a suspension element 60 is suitably secured to and depends from a crossbar 27a in FIG. 8 and has a connecting member 61, such as one leaf or hinge member 61 of a butt hinge or the like, welded or otherwise secured thereto. The connecting member 61 is connected to that connecting member 46 on the rear or trailing end of that pipe supporting member 21 of the first pipe supporting apparatus A in essentially the same manner in which the hinge members 44, 46 are shown interconnected in FIG. 7 during installation of a respective start-up pipe section. Therefore, those remaining parts of the start-up pipe anchoring support unit 20a which correspond to parts of the anchoring support unit 20 will bear the same reference characters with the suffix "a" added to avoid repetitive description, and a further description of the start-up pipe anchoring support unit is deemed unnecessary.

METHOD OF OPERATION

For the purpose of description, this method of operation will be given assuming that an otherwise unsupported rear or trailing end of a pipe section is first to be installed, for example, adjacent the distribution box B of FIG. 1. Accordingly, the start-up pipe anchoring support unit 20a of FIG. 8 may be positioned adjacent the distribution box and its anchoring members 25a would be driven into the grade surface 11 in the ditch 12. The crossbar 27a then may be adjusted to the desired level above the grade surface and the screws 30a then tightened to maintain the crossbar 27a in the desired adjusted position.

The first pipe supporting apparatus A then may be positioned in the ditch 12 as shown in FIGS. 2, 3 and 4, whereupon the rear or trailing end portion of the respective elongate, rigid pipe supporting member 21 would be connected to the start-up pipe anchoring support unit 20a by connecting the rear connecting member 46 on the pipe supporting member 21 to the start-up connecting member 61 in substantially the same manner as heretofore described with respect to the members 44, 46 in FIG. 7, and as shown in FIG. 8. As described hereinbefore, it is apparent that, after the first pipe supporting apparatus is positioned in the ditch 12, the anchoring members 25 of the pipe anchoring support unit 20 are driven into the grade surface 11 and the forward end portion of the pipe supporting member 21 is then adjusted to the desired position above grade by adjusting the crossbar 27 relative to the anchoring members 25.

A first pipe section 10 is then positioned beneath the elongate pipe supporting member 21 and between the anchoring members 25 while the clamping jaws 51, 52 of the clamping units 22 spaced along the pipe supporting member 21 occupy the open position of FIG. 5. With the pipe section 10 held against the lower surface of the elongate pipe supporting member 21, the clamping jaws 51, 52 are then manually closed, as in FIG. 6, to clampingly support the pipe section 10 parallel to and in suspended relation to the supporting member 21.

After an operator has adjusted the crossbar 27 of the pipe anchoring and support unit 20 so that the end portion of the pipe section 10 remote from the start-up pipe anchoring support unit 20a is in the desired proper alignment and at the desired height above the grade surface 11 as heretofore described, the operator pours and spreads aggregate or other suitable fill to the desired level above the grade surface 11 and in surrounding relation to the corresponding pipe section 10 while maintaining the pipe section 10 and the supporting apparatus A against horizontal or vertical displacement by virtue of the manner in which the pipe anchoring support units 20 and 20a have previously been installed and positioned in the depth 12.

Preferably, before the aggregate is poured and spread in the ditch in surrounding relation to the first pipe section, the second pipe supporting apparatus A-1, of substantially the same construction as the first pipe supporting apparatus A, is positioned in the ditch 12 with the trailing end portion thereof being connected to the leading end portion of the first pipe supporting apparatus, simply by utilizing the respective connecting pin 48 for interconnecting the connecting members 44, 46 to each other at the juncture of the adjacent elongate pipe supporting members 21 as shown, for example, in FIG. 7. As is the case with respect to the first pipe supporting apparatus A, the then leading portion of the second pipe supporting apparatus A-1 is positioned in the ditch and anchored in proper alignment and at the desired height above the grade surface by means of the respective pipe anchoring support unit 20.

The foregoing procedure with respect to the first pipe supporting apparatus A is then followed in substantially the same manner with respect to the second pipe supporting apparatus A-1, during which a second pipe section is interconnected to the pipe section supported by the first apparatus A and is clampingly supported under the support member 21 of the second apparatus A-1. However, the start-up pipe anchoring support unit 20a of FIG. 8 need not then be used, because the trailing or rear end portion of the elongate pipe support member of the second pipe supporting apparatus A-1 is then being supported by the leading end portion of that elongate pipe supporting member 21 of the first pipe supporting apparatus A (see FIG. 7).

After the second pipe section 10 has been communicatively connected to the leading or front end portion of the first pipe section 10, and following the pouring and spreading of aggregate to the proper level above grade and in surrounding relation to at least the first pipe section, but with the upper portions of the clamping units 22 of the first pipe supporting apparatus A being left uncovered or exposed, the first pipe supporting apparatus then may be removed from the ditch and the aggregate in the ditch by an operator or operators grasping and moving the exposed hand levers 57 of the respective clamping units 22 to open position for releasing the pipe section from the respective clamping units 22. Thereupon, the operator or operators grasp the respective handle members 25' and 25a' of the pipe anchoring support units 20, 20a and pull the same upwardly to lift and remove the first pipe supporting apparatus from the ditch 12 and the previously poured and spread aggregate while leaving the respective pipe section 10 embedded in the aggregate.

It is apparent that the trailing end of the pipe supporting member 21 of the first pipe supporting apparatus need not necessarily be disconnected from the start-up pipe anchoring support unit 20a for permitting removal of the first pipe supporting apparatus from the aggregate poured around the first pipe section, since the start-up anchoring support unit 20a may be lifted out of the ditch 12 along with the respective elongate pipe supporting member 21. However, the interconnected end portions of the first and second pipe supporting apparatuses are disengaged from each other, by removing the hinge pin 48 from those connecting members 44, 46 (FIG. 7) at the respective front and rear end portions of the two elongate pipe supporting members 21 of the respective first and second pipe supporting apparatuses A and A-1. In this way, the second pipe supporting apparatus A-1 can remain in its position in the ditch 12 while the first pipe supporting apparatus is being removed from the ditch.

With the start-up pipe anchoring support unit 20a then being removed from the first pipe supporting apparatus A, this first apparatus is then positioned adjacent the opposite or front end of the second pipe supporting apparatus A-1 in substantially the same manner as that described with respect to the manner in which the second pipe supporting apparatus A-1 was previously positioned adjacent the front or forward end of the first pipe supporting apparatus A. The first pipe supporting apparatus is then interconnected with the second pipe supporting apparatus by interconnecting the proximal ends of the respective elongate, rigid pipe supporting members 21, and the operation is repeated until the desired number of interconnected pipe sections are properly laid to form the drain field.

FIG. 9 illustrates how the single elongate, rigid pipe supporting member 21' there shown may be carried by two of the pipe anchoring support units 20', each of which may be of substantially the same construction as the pipe anchoring support unit 20 shown in FIGS. 2, 3 and 4. The two pipe anchoring support units are useful for supporting a pipe supporting member 21' adjacent opposite ends thereof, especially in instances where the pipe supporting member is of considerable length, such as about twenty feet long, for example, and can be used in a substantially straight portion of the ditch 12. A single relatively long pipe section 10' may be supported by the supporting apparatus of FIG. 9, or two or more relatively shorter pipe sections may be joined together and then supported by the apparatus of FIG. 9, as may be desired, in carrying out the method of this invention. Since the pipe anchoring support units 20' of FIG. 9 may be attached to the elongate pipe support member 21' in the same manner as that in which the pipe anchoring support unit 20 is attached to the elongate pipe supporting member 21 in FIGS. 2, 3 and 4, and clamping units 22' carried by pipe support member 21' may be the same as the clamping units 22, a further description of the apparatus of FIG. 9 is deemed unnecessary.

It is to be noted that, when the rear end portion of the elongate pipe supporting member 21 of the first pipe supporting apparatus A is attached to the start-up pipe anchoring support unit 20a (FIG. 8) and the anchoring members or posts 25, 25a of both of the pipe anchoring support units 20, 20a have been driven into the grade surface 11, both of the anchoring support units cooperate with each other to serve as spaced apart positioning means for positioning the respective supporting member 21 at the proper height above grade and for anchoring the supporting member 21 in position during clamping of the respective pipe section 10 to the elongate pipe supporting member 21, pouring and spreading of the aggregate in the ditch 12, and releasing of the embedded pipe section from the clamping units 22. Further, since the pipe supporting apparatuses A, A-1 are of similar construction, it can be seen that when they are interconnected (as by the connecting members 44, 46 at the proximal ends of the adjacent pipe supporting members 21), both that pipe anchoring support unit 20 of the rearward or first pipe supporting apparatus A and the rear end portion of the forward pipe supporting member 21 also serve as positioning means cooperating with each other for positioning the then rearward pipe supporting member 21 at the desired proper height above grade and for anchoring the same in the desired position during subsequent pipe laying operations as mentioned above. Of course, where two of the pipe anchoring units, such as those indicated at 20' in FIG. 9, support a common elongate pipe supporting member 21' it is apparent that both pipe anchoring support units 20', as there shown, also serve as spaced apart positioning means adapted to penetrate into the grade surface 11 for positioning the elongate support member 21' at the proper height above grade and for anchoring the support member 21' is position during clamping of the pipe section, pouring and spreading of the aggregate, and releasing of the embedded pipe section.

In the drawings and specification there have been set forth preferred embodiments of the invention, and although specific terms are employed, they are used in a generic and descriptive sense only and not for purposes of limitation.

What is claimed is:

1. An apparatus for supporting pipe sections in desired position during construction of drain fields and the like which construction includes the laying of connected pipe sections with surrounding aggregate on a grade surface below ground level, said apparatus comprising:
   (a) an elongate, generally horizontally disposed support member;
   (b) clamping means carried by said support member at spaced apart locations along the length thereof for receiving and clampingly supporting at least one pipe section parallel to and suspended from said support member; and
   (c) positioning means disposed at spaced points along said support member and adapted to penetrate into the grade surface for positioning said support member at the proper height above grade and for anchoring said support member in position during clamping of the pipe section, pouring and spreading of the aggregate, and releasing of the embedded pipe section.

2. An apparatus according to claim 1 wherein said positioning means comprises a pair of substantially vertically disposed, elonate anchoring members adapted to be driven into the grade surface so as to be firmly anchored against displacement, and mounting means carried by said support member and adjustably connected to said anchoring members for mounting said support member on said anchoring members for vertical adjustment to position the support member at a desired height above grade.

3. Apparatus according to claim 2 wherein said mounting means is connected to said support member and extends upwardly therefrom and is adjustably connected to said anchoring members at points spaced above said support member for ready access to said adjustable connections at all times.

4. An apparatus according to any one of claims 1–3 further comprising a pair of vertically disposed elongate footed members adjustably connected to said anchoring members and adapted to engage non-firm grade surfaces for positioning said support member at the proper height above grade.

5. An apparatus for supporting pipe sections in desired position during construction of drain fields and the like which construction includes the laying of connected pipe sections with surrounding aggregate on a grade surface below ground level, said apparatus comprising:
   (a) an elongate, generally horizontally disposed support member;

(b) clamping means carried by said support member at spaced apart locations along the length thereof for receiving and clampingly supporting at least one pipe section parallel to and suspended from said support member, each of said clamping means comprising opposing clamping jaws mounted on said support member for relative movement toward and away from each other for selectively clamping and releasing a pipe section therebetween, and actuating means for effecting relative movement between said clamping jaws to positively clamp or release a pipe section therebetween; and (c) positioning means operably associated with said support member and adapted to engage the grade surface for positioning said support member at the proper height above grade and for maintaining said support member in position during clamping of the pipe sections, pouring and spreading of the aggregate, and releasing of the embedded pipe sections.

6. Apparatus according to claim 5 wherein said clamping jaws of each of said clamping means comprises first and second jaw members having contoured lower portions adapted to fit the circumferential contour of a pipe section and upper portions connected to said support member and extending upwardly therefrom, said first jaw member being pivotally mounted on said support member for movement toward and away from said second jaw member and said second jaw member being fixedly mounted on said support member, and said actuating means being connected to said upper portions of said first and second jaw members for ready access after pouring and spreading of the aggregate.

7. Apparatus according to claim 6 wherein said actuating means includes means for moving said upper portions of said first jaw member toward and away from said upper portion of said second jaw member, and locking means for locking said jaw members in the pipe clamping position.

8. Apparatus according to claim 6 wherein said actuating means comprises first and second actuating members hinged together at their proximal ends and hingedly connected to the respective upper portions of said jaw members at their distal ends, and a locking and operating member having a mounting portion fixed to the upper surface of one of said members and a locking portion integral with said mounting portion and extending outwardly and upwardly therefrom at an obtuse angle with the juncture of said mounting and locking portions being closely adjacent the hinged connection of the proximal ends of said actuating members, whereby said locking and operating member permits manual upward and downward pivotal movement of said actuating members to clamp and unclamp pipe sections between said jaw members and to lock said jaw members in the clamped position when said actuating members are moved downwardly past horizontal and said locking portion engages the other of said actuating members.

9. An apparatus according to any one of claims 5-8 wherein said positioning means comprises a pair of vertically disposed, elongate anchoring members adapted to be driven into the grade surface so as to be firmly anchored against displacement, and mounting means carried by said support member and adjustably connected to said anchoring members for mounting said support member on said anchoring members for vertical adjustment to position the support member at the desired height above grade.

10. An apparatus for supporting pipe sections in desired position during construction of drain fields and the like which construction includes the laying of connected pipe sections with surrounding aggregate on a grade surface below ground level, said apparatus comprising:

(a) an elongate, generally horizontally disposed support member comprising a plurality of support member sections interconnected for relative horizontal pivotal movement to permit the laying of pipe sections in any one of straight line, curved, or angular configurations or combination thereof;

(b) clamping means carried by said support member at spaced apart locations along the length thereof for receiving and clampingly supporting at least one pipe section parallel to and suspended from said support member; and (c) positioning means operably associated with each of said support member sections and adapted to engage the grade surface for positioning said support member sections at the desired height above grade and for maintaining said support member sections in position during clamping of the pipe sections, pouring and spreading of the aggregate, and releasing of the embedded pipe sections.

11. An apparatus according to claim 10 wherein each of said positioning means comprises a pair of vertically disposed, elongate anchoring members adapted to be driven into the grade surface so as to be firmly anchored against displacement, and mounting means carried by said support member sections and adjustably connected to said anchoring members for mounting said support member sections on said anchoring members for vertical adjustment to position the support member sections at the desired height above grade.

12. An apparatus according to either of claims 10 or 11 wherein each of said clamping means comprises opposing clamping jaws mounted on said support member for relative movement toward and away from each other for selectively clamping and releasing a pipe section therebetween, and actuating means for effecting relative movement between said clamping jaws to positively clamp or release a pipe section therebetween.

13. An apparatus for supporting pipe sections in desired position during construction of drain fields and the like which construction includes the laying of connected pipe sections with surrounding aggregate on a grade surface below ground level, comprising:

(a) an elongate, generally horizontally disposed support member;

(b) clamping means carried by said support member at spaced apart locations along the length thereof for receiving and clampingly supporting at least one pipe section parallel to and suspended from said support member;

(c) positioning means disposed at spaced points along said support member and adapted to engage the grade surface for positioning said support member at the proper height above grade and for maintaining said support member in position during clamping of the pipe section, pouring and spreading of the aggregate, and releasing of the embedded pipe section; and (d) connection means carried by opposite end portions of said support member for connecting each such end portion of said apparatus to an adjacent end portion of another apparatus for horizontal pivotal movement therebetween to permit the laying of pipe in any one of straight line, curved, or angular configurations or combination thereof.

14. An apparatus according to claim 13 wherein said connection means comprises first and second connecting members, said first connecting member being pivotally mounted on one end portion of said support member and said second connecting member being mounted on the other end portion of said support member, said first and second connecting members having cooperating portions for connecting the first connecting member on one apparatus to the second connecting member of another apparatus.

15. An apparatus according to claim 14 wherein said cooperating portions of said first and second connecting members comprise spaced apart projecting portions having aligned holes therethrough, and wherein said connection means further includes a connecting pin adapted to be inserted through the aligned holes in said projecting portion of the connecting members on adjacent end portions of two support members to quickly and easily connect two such apparatus together.

16. Apparatus according to any of claims 13–15 wherein said positioning means includes a start-up positioning means having connection means carried thereby for detachably connecting said start-up positioning means to said connection means on the end portion of said support member at the trailing end of the initial pipe section of a run of connected pipe sections to be laid whereby such trailing end of the apparatus is securely positioned and anchored during the laying of such initial pipe section.

17. A method of laying a drain field comprising the steps of:
(a) positioning first pipe supporting apparatus having a generally horizontal elongate support member with spaced apart positioning and anchoring means in desired proper alignment and at a desired height above grade surface;
(b) clampingly supporting at least one pipe section parallel to and in suspended relation to the support member;
(c) positioning a second pipe supporting apparatus adjacent one end of the first apparatus in substantially the same manner as the first apparatus was positioned;
(d) interconnecting adjacent end portions of the first and second pipe supporting apparatuses to allow pivotal movement therebetween;
(e) interconnecting an additional pipe section to the pipe section supported by the first apparatus and clampingly supporting the additional pipe section under the support member of the second pipe supporting apparatus;
(f) pouring and spreading aggregate to the desired level above the grade surface and in surrounding relation to at least the first pipe section while maintaining the pipe sections and supporting apparatuses against horizontal or vertical displacement;
(g) releasing the said one pipe section from its clamping support by the said first pipe supporting apparatus and disengaging the interconnected end portions of the first and second pipe supporting apparatuses;
(h) removing the first pipe supporting apparatus from the aggregate while leaving the said one pipe section embedded therein; and
(i) positioning the first pipe supporting apparatus adjacent the opposite end portion of the second pipe supporting apparatus remote from said one pipe section and interconnecting the adjacent end portions of the first and second pipe supporting apparatuses and proceeding in like manner until the desired number of interconnected pipe sections are laid to form the drain field.

18. A method according to claim 17 wherein each step of positioning the pipe supporting apparatus comprises driving vertically disposed elongate anchoring members into the grade surface and vertically adjusting the elongate support member on said anchoring members.

19. A method according to claim 17 wherein the step of positioning the first pipe supporting apparatus includes:
(a) placing a start-up anchoring means at the beginning of a drain line, and connecting the adjacent end portion of the first pipe supporting apparatus to the start-up anchoring means, and removing the start-up anchoring means once the respective pipe section is embedded in aggregate.

* * * * *

UNITED STATES PATENT AND TRADEMARK OFFICE
CERTIFICATE OF CORRECTION

PATENT NO. : 4,268,189
DATED : May 19, 1981
INVENTOR(S) : William C. Good

It is certified that error appears in the above-identified patent and that said Letters Patent are hereby corrected as shown below:

Column 6, line 46, before "medial" insert -- a --.

Column 8, line 25, "compriss" should be -- comprises --.

Column 8, line 35, "jucture" should be -- juncture --.

Column 9, line 68, "depth" should be -- ditch --.

Column 12, line 9, "is" should be -- in --.

Column 12, Claim 2, line 41, "elonate" should be -- elongate --.

Signed and Sealed this

Eighteenth Day of August 1981

[SEAL]

Attest:

GERALD J. MOSSINGHOFF

Attesting Officer

Commissioner of Patents and Trademarks